April 13, 1943.  E. W. LITTLE  2,316,263

CAGE

Filed April 29, 1941

INVENTOR

Patented Apr. 13, 1943

2,316,263

UNITED STATES PATENT OFFICE 2,316,263

CAGE

Earl W. Little, Indianapolis, Ind.; Edward W. Little administrator of said Earl W. Little, deceased Application April 29, 1941, Serial No. 390,967

2 Claims. (Cl. 47—35)

This invention relates to cages designed primarily for the reception and display of plant life, although it will be understood that it may be used for various other purposes if desired.

One feature of the invention is the provision of a body portion, preferably constructed of wire and a bowl or base portion preferably constucted of crockery or metal and separable from each other.

A further feature of the invention is the provision of means for removably attaching the bowl portion to body portion and suspending the bowl portion from the body portion when said parts are assembled tgether.

A further feature of the invention is in so constructing the lower portion of the body forming member that the extreme lower portion thereof may be expanded so that the upper portion of the bowl forming member may enter and be engaged with the bowl suspending or attaching members carried by the body forming member.

A further feature of the invention is the provision of means for locking the lower portion of the body portion against expansion, whereby the bowl portion will be securely held in engagement with the body portion of the cage until it is again desired to release the bowl.

A further feature of the invention is in so constructing the lower end of the body portion of the cage that it will rest upon the top edge of the bowl portion, when the parts of the cage are assembled together and form a more or less solid union between the cage parts.

Other objects and advantages will be hereinafter more fully set forth.

In the accompanying drawing forming a part of this application:

Figure 1:
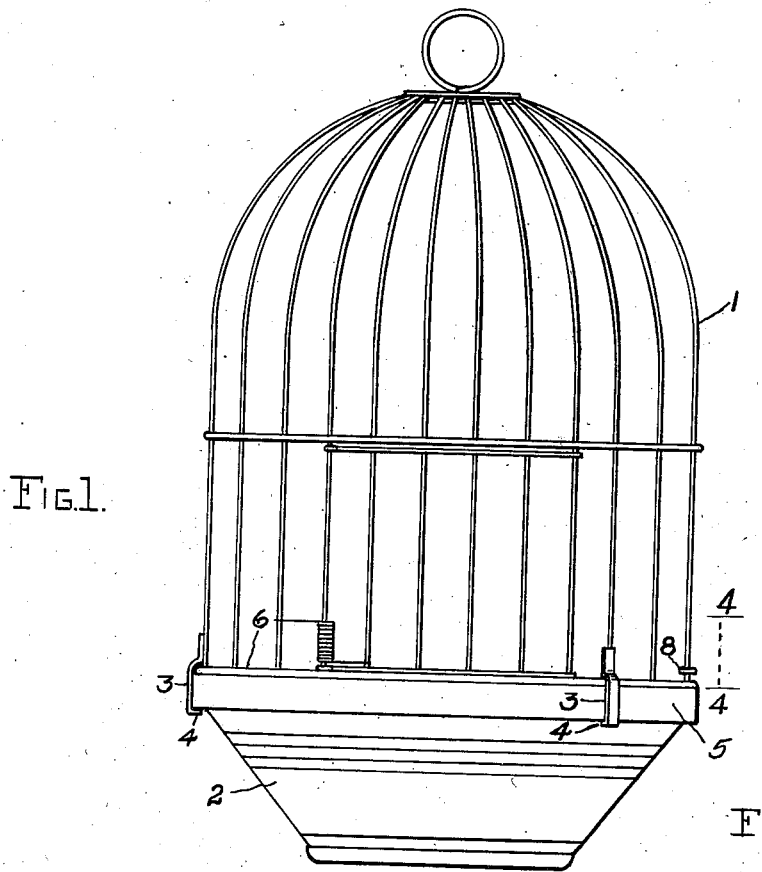
Figure 1 is an elevational view of the cage, with the parts thereof assembled together.
Figure 3:
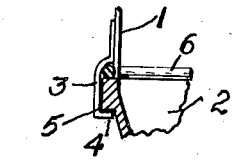
Figure 3 is a detail sectional view through the lower portion of the cage body as seen along line 3—3, Fig. 2.
Figure 2:
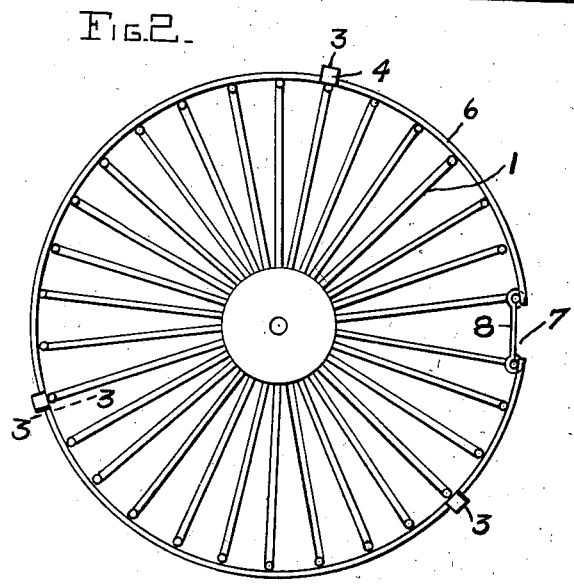
Figure 2 is a bottom plan view of the cage forming body with the bowl removed.

Referring to the drawing, the numeral 1 designates the body portion of the cage, which is preferably constructed of assembled wires and 2 indicates the bowl or bottom portion of the cage, said bowl being formed of any suitable material, preferably crockery or the like.

The body portion 1 and bowl 2 are preferably formed separable so that the bowl may be removed for entering a plant or other object therein and the bowl is removably attached to the body portion by means of hangers 3, the upper ends of the hangers being attached to the wires of the body portion while the lower ends thereof extend a distance below to body 1 and have inwardly extending ledges 4 for engagement with a collar 5 at the upper edge of the bowl 2.

Figure 4:
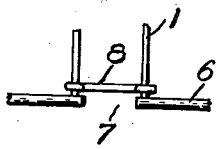
Figure 4 is a fragmentary elevation of a portion of the lower edge of the cage body as viewed from the line 4—4, Fig. 1.

As the hangers 3 are fixed to the body 1 and as the ledges 4 pass below the collar 5, the lower portion of the body 1 is so arranged that it may be expanded to permit the passage of the top portion of the bowl between the depending portions of the hangers and permit the ledges to pass beneath the collar 5. To accomplish this result and at the same time maintain the proper diameter of the cage body under normal conditions, a wire band 6 is placed around the extreme lower ends of the wires forming the body portion 1 and fixed thereto in any approved manner, a section of the wire band 6 being omitted to form a gap 7 in the circumference of the band, as more clearly shown in Fig. 4 of the drawing. By providing the gap 7, the lower portion of the body 1 may be expanded or sprung outwardly so that the top portion of the bowl 2 may pass between the hangers 3 so that when the expanding pressure is released from the lower portion of the body 1, the tension of the band 6 will retract wires of the body and cause the ledges 4 to pass below and interlock with the collar 5, thus interlocking the bowl with the cage body.

Any suitable means may be provided for preventing the expansion of the body 1, in this instance a link 8, the ends of which are slidably mounted on the wires of the cage body adjacent the ends of the gap 7, so that when the link is moved to the lower ends of the wires on which it is mounted, the body 1 is locked against expansion and the ledges 4 locked beneath the collar 5. As the band 6 rests directly on the top edge of the bowl 2, when the body and bowl are in assembled relation, the union between the body and bowl will be more or less rigid.

In operation, when a plant or other object is to be placed in the bowl, the link 8 is moved upwardly the proper distance and pressure applied to the body portion 1 to widen the gap 7 and permit the bowl to be released from the hangers 3. After the bowl has been filled, the gap 7 is again enlarged and the bowl reengaged with the body 1. The link 8 is then again lowered for locking the body and bowl together.

What I claim is:

1. The combination with a cage body and a removable bowl therefor, of hangers fixed to said body and depending therefrom adapted to engage and suspend said bowl, a band attached to said body portion, said band having a gap therein whereby said body may be expanded for releasing said hangers from said bawl or positioning them for receiving said bowl, and means for locking said body against expansion.

2. The combination with a cage body, a band fixed to said body having a gap in its length for rendering said cage body expansible, and hangers depending from said body, said hangers having inwardly extending ledges at their lower ends, of a bowl having a collar adjacent its upper extremity for engagement with the ledges on said hangers, for suspending said bowl from said cage body, and means for locking said cage body against expansion.

EARL W. LITTLE.